US012238502B2

(12) United States Patent
Farrar et al.

(10) Patent No.: US 12,238,502 B2
(45) **Date of Patent: *Feb. 25, 2025**

(54) CHANNEL-BASED CONTROL OF AUDIO TRANSMISSIONS

(71) Applicant: LISNR, Inc., Cincinnati, OH (US)

(72) Inventors: Rebekah Farrar, Columbus, OH (US); Oz Mendel, Piedmont, CA (US); William Knauer, Bellevue, KY (US); Ethan Tyink, New Palestine, IN (US)

(73) Assignee: LISNR, INC., Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/375,107

(22) Filed: Sep. 29, 2023

(65) Prior Publication Data

US 2024/0121566 A1 Apr. 11, 2024

Related U.S. Application Data

(63) Continuation of application No. 17/525,423, filed on Nov. 12, 2021, now Pat. No. 11,778,401, which is a continuation-in-part of application No. 17/388,797, filed on Jul. 29, 2021, now Pat. No. 11,622,217, which is a continuation of application No. 16/823,740, filed on Mar. 19, 2020, now Pat. No. 11,095,999.

(51) Int. Cl.
*H04S 3/00* (2006.01)

(52) U.S. Cl.
CPC .......... *H04S 3/008* (2013.01); *H04S 2400/01* (2013.01)

(58) Field of Classification Search
CPC ...... H04S 3/008; H04S 2400/01; H04R 29/00
USPC ............................ 381/56, 58, 122, 124, 300
See application file for complete search history.

(56) References Cited

U.S. PATENT DOCUMENTS

| | | | | |
|---|---|---|---|---|
| 5,115,240 | A | 5/1992 | Fujiwara | |
| 7,706,548 | B2 * | 4/2010 | Kanevsky | H04B 11/00 714/13 |
| 8,160,276 | B2 | 4/2012 | Liao et al. | |
| 2003/0045312 | A1 | 3/2003 | Wildhagen | |
| 2007/0104332 | A1 | 5/2007 | Clemens | |
| 2008/0165622 | A1 * | 7/2008 | Liao | H04B 11/00 367/198 |

(Continued)

OTHER PUBLICATIONS

International Search Report and Written Opinion for International Application No. PCT/US2021/022708 mailed Apr. 21, 2021, (6 pages).

(Continued)

*Primary Examiner* — William A Jerez Lora
(74) *Attorney, Agent, or Firm* — NORTON ROSE FULBRIGHT US LLP

(57) ABSTRACT

Methods and systems for controlling the receipt and transmission of audio transmissions are provided. In one embodiment, a method is provided that includes selecting a first audio channel and transmitting a first audio transmission using the first audio channel. A second audio transmission may then be received that contains an acknowledgment of the first audio transmission. In certain instances, the second audio transmission may be received on the first audio channel. If a second audio transmission is received on the first audio channel, it may be determined that the first audio transmission was successfully received by another computing device.

20 Claims, 9 Drawing Sheets

(56) References Cited

U.S. PATENT DOCUMENTS

| | | | | |
|---|---|---|---|---|
| 2009/0180643 | A1* | 7/2009 | Sander | H04M 1/05 381/122 |
| 2010/0278346 | A1 | 11/2010 | Hogue | |
| 2013/0322348 | A1 | 12/2013 | Julian | |
| 2015/0088495 | A1* | 3/2015 | Jeong | H04B 11/00 704/205 |
| 2015/0341724 | A1* | 11/2015 | Pedersen | H04W 4/80 381/300 |
| 2016/0134979 | A1 | 5/2016 | El-Hoiydi | |
| 2016/0182172 | A1* | 6/2016 | Seemiller | H04H 20/93 381/56 |

OTHER PUBLICATIONS

Smajdalf, "How to change channel in nRF24 and not lose communication", Dec. 2017.

* cited by examiner

CHANNEL-BASED CONTROL OF AUDIO TRANSMISSIONS

CROSS-REFERENCE TO RELATED APPLICATIONS

The present application is a continuation of U.S. patent application Ser. No. 17/525,423 filed Nov. 12, 2021, which is a continuation-in-part of U.S. patent application Ser. No. 17/388,797 filed Jul. 29, 2021 (now U.S. Pat. No. 11,622, 217), which is a continuation of U.S. patent application Ser. No. 16/823,740 filed Mar. 19, 2020 (now U.S. Pat. No. 11,095,999). The disclosures of both applications are hereby incorporated by reference for all purposes.

BACKGROUND

Data often needs to be transmitted between computing devices without connecting both devices to the same computing network. For example, in certain applications, a computing network may not exist near the computing devices, or it may be too cumbersome (e.g., may take too long) to connect one or both of the computing devices to a nearby computing network. Therefore, data may be transmitted directly from one computing device to another computing device.

SUMMARY

The present disclosure presents new and innovative systems and methods for controlling the receipt and transmission of audio transmissions are provided. In a first aspect, a method is provided that includes selecting a first audio channel and transmitting, from a first computing device, a first audio transmission to a second computing device using the first audio channel. The method may further include waiting for a predetermined period of time to receive a second audio transmission containing an acknowledgment of the first audio transmission on the first audio channel. Responsive to receiving the second audio transmission within the predetermined period of time, the method may also include determining that the first audio transmission was successfully received.

In a second aspect according to the first aspect, an expected duration of the second audio transmission is shorter than a duration of the first audio transmission. The predetermined period of time may be a multiple of the expected duration of the second audio transmission.

In a third aspect according to the second aspect, the multiple is greater than or equal to 2 and less than or equal to 4.

In a fourth aspect according to any of the first through third aspects, the method further includes, responsive to not receiving the second audio transmission within the predetermined period of time, selecting a second audio channel and transmitting, from the first computing device, the first audio transmission to the second computing device using the second audio channel. The method may further include waiting for the predetermined period of time to receive the second audio transmission containing an acknowledgment of the first audio transmission on the second audio channel.

In a fifth aspect according to any of the first through fourth aspects, the first audio channel is randomly selected from among a plurality of audio channels.

In a sixth aspect according to the fifth aspect, the method further includes, prior to selecting the first audio channel, detecting, on a fourth audio channel separate from the plurality of audio channels, an audio transmission identifying the second computing device.

In a seventh aspect according to any of the fifth and sixth aspects, the plurality of audio channels includes at least 5 audio channels.

In an eighth aspect according to any of the fifth through seventh aspects, the plurality of audio channels each comprise a range of frequencies with a predetermined bandwidth.

In a ninth aspect according to the eighth aspect, the plurality of audio channels are separated by a predetermined frequency band.

In a tenth aspect according to any of the eighth and ninth aspects, the plurality of audio channels are contained within a range of 9.5-18.5 kHz.

In an eleventh aspect according to any of the first through tenth aspects, the method further comprises, responsive to not receiving the second audio transmission, storing an indication that the first audio channel should not be used for audio transmissions for a predetermined period of time.

In a twelfth aspect, a system is provided that includes a processor and a memory. The memory may store instructions which, when executed by the processor, cause the processor to select a first audio channel and transmit, from a first computing device, a first audio transmission to a second computing device using the first audio channel. The instructions may also cause the processor to wait for a predetermined period of time to receive a second audio transmission containing an acknowledgment of the first audio transmission on the first audio channel. Responsive to receiving the second audio transmission within the predetermined period of time, the instructions may further cause the processor to determine that the first audio transmission was successfully received.

In a thirteenth aspect according to the twelfth aspect, an expected duration of the second audio transmission is shorter than a duration of the first audio transmission. The predetermined period of time may a multiple of the expected duration of the second audio transmission.

In a fourteenth aspect according to the thirteenth aspect, the multiple is greater than or equal to 2 and less than or equal to 4.

In a fifteenth aspect according to any of the twelfth through fourteenth aspects, the instructions further cause the processor, responsive to not receiving the second audio transmission within the predetermined period of time, to select a second audio channel and transmit, from the first computing device, the first audio transmission to the second computing device using the second audio channel. The instructions may also cause the processor to wait for the predetermined period of time to receive the second audio transmission containing an acknowledgment of the first audio transmission on the second audio channel.

In a sixteenth aspect according to any of the twelfth through fifteenth aspects, the first audio channel is randomly selected from among a plurality of audio channels.

In a seventeenth aspect according to the sixteenth aspect, the method further includes, prior to selecting the first audio channel, detecting, on a fourth audio channel separate from the plurality of audio channels, an audio transmission identifying the second computing device.

In an eighteenth aspect according to any of the sixteenth and seventeenth aspects, the plurality of audio channels includes at least 5 audio channels.

In a nineteenth aspect according to any of the sixteenth through eighteenth aspects, the plurality of audio channels each comprise a range of frequencies with a predetermined bandwidth.

In a twentieth aspect according to the nineteenth aspect, the plurality of audio channels are separated by a predetermined frequency band.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the disclosed subject matter.

DETAILED DESCRIPTION OF EXAMPLE EMBODIMENTS

Aspects of the present disclosure relate to transmitting and receiving audio transmissions between multiple devices. In certain aspects, a single computing device may receive audio transmissions from multiple computing devices and may transmit acknowledgments to the multiple computing devices in response to the audio transmissions.

Various techniques and systems exist to exchange data between computing devices without connecting to the same communication network. For example, the computing devices may transmit data via direct communication links between the devices. In particular, data may be transmitted according to one or more direct wireless communication protocols, such as Bluetooth®, ZigBee®, Z-Wave®, Radio-Frequency Identification (RFID), Near Field Communication (NFC), and Wi-Fi® (e.g., direct Wi-Fi® links between the computing devices). However, each of these protocols relies on data transmission using electromagnetic waves at various frequencies. Therefore, in certain instances (e.g., ZigBee®, Z-Wave®, RFID, and NFC), computing devices may typically require specialized hardware to transmit data according to these wireless communication protocols. In further instances (e.g., Bluetooth®, ZigBee®, Z-Wave®, and Wi-Fi®), computing devices may typically have to be communicatively paired in order to transmit data according to these wireless communication protocols. Such communicative pairing can be cumbersome and slow, reducing the likelihood that users associated with one or both of the computing devices will utilize the protocols to transmit data.

Figure 1:
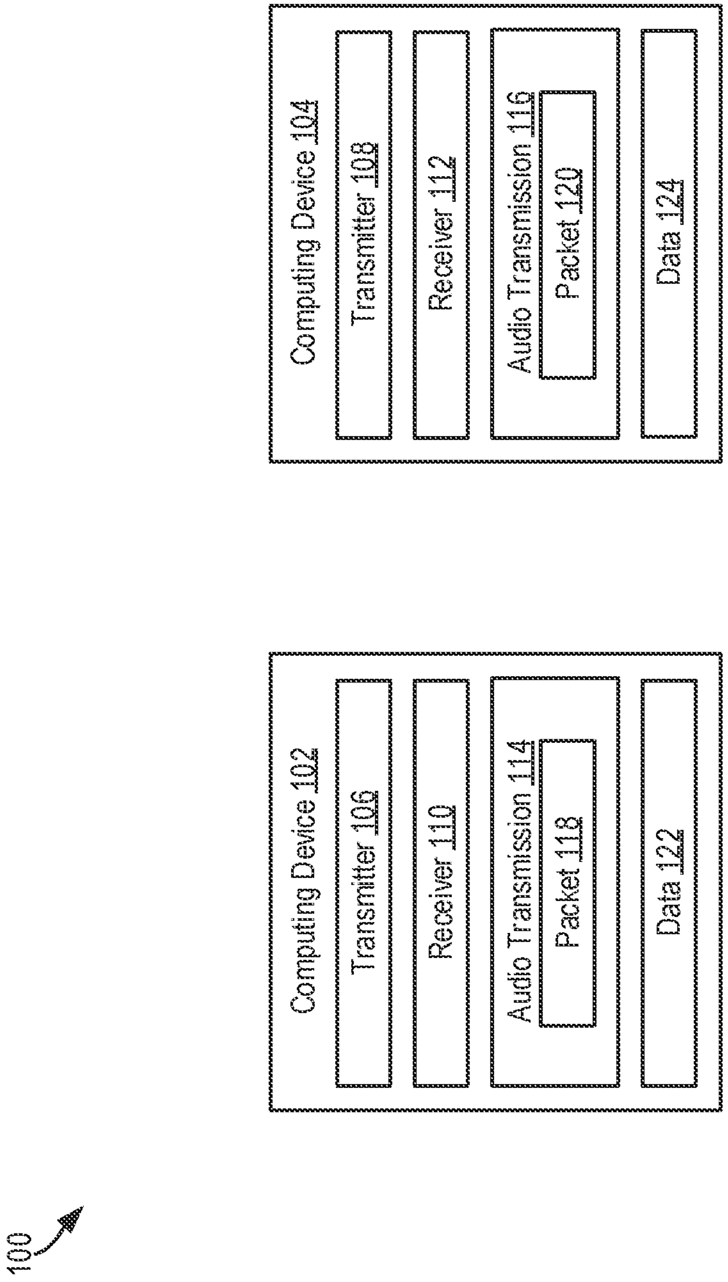
FIG. 1 illustrates a system according to an exemplary embodiment of the present disclosure.

Therefore, there exists a need to wirelessly transmit data in a way that (i) does not require specialized hardware and (ii) does not require communicative pairing prior to data transmission. One solution to this problem is to transmit data using audio transmissions. For example, FIG. 1 illustrates a system 100 according to an exemplary embodiment of the present disclosure. The system 100 includes two computing devices 102, 104 configured to transmit data 122, 124 using audio transmissions 114, 116. In particular, each computing device 102, 104 includes a transmitter 106, 108 and a receiver 110, 112. The transmitters 106, 108 may include any type of device capable of generating audio signals, such as speakers. In certain implementations, the transmitters 106, 108 may be implemented as a speaker built into the computing device 102, 104. For example, one or both of the computing devices may be a smart phone, tablet computer, and/or laptop with a built-in speaker that performs the functions of the transmitter 106, 108. In other implementations, the transmitters 106, 108 may be implemented as a microphone external to the computing device 102, 104. For example, the transmitters 106, 108 may be implemented as one or more speakers externally connected to the computing device 102, 104.

The receivers 110, 112 may include any type of device capable of receiving audio transmissions and converting the audio transmissions into signals (e.g., digital signals) capable of being processed by a processor of the computing device, such as microphones. In other implementations, the receivers 110, 112 may be implemented as a microphone built into the computing device 102, 104. For example, one or both of the computing devices may be a smartphone, tablet computer, and/or laptop with a built-in microphone that performs the functions of the receivers 110, 112. In other implementations, the receivers 110, 112 may be implemented as a microphone external to the computing device 102, 104. For example, the receivers 110, 112 may be implemented as one or more microphones external to the computing device 102, 104 that are communicatively coupled to the computing device 102, 104. In certain implementations, the transmitter 106, 108 and receiver 110, 112 may be implemented as a single device connected to the computing device. For example, the transmitter 106, 108 and receiver 110, 112 may be implemented as a single device containing at least one speaker and at least one microphone that is communicatively coupled to the computing device 102, 104.

In certain implementations, one or both of the computing devices 102, 104 may include multiple transmitters 106, 108 and/or multiple receivers 110, 112. For example, the computing device 104 may include multiple transmitters 108 and multiple receivers 112 arranged in multiple locations so that the computing device 104 can communicate with the computing device 102 in multiple locations (e.g., when the computing device 102 is located near at least one of the multiple transmitters 108 and multiple receivers 112. In additional or alternative implementations, one or both of the computing devices 102, 104 may include multiple transmitters 106, 108 and/or multiple receivers 110, 112 in a single location. For example, the computing device 104 may include multiple transmitters 108 and multiple receivers 112 located at a single location. The multiple transmitters 108 and multiple receivers 112 may be arranged to improve coverage and/or signal quality in an area near the single location. For example, the multiple transmitters 108 and multiple receivers 112 may be arranged in an array or other configuration so that other computing devices 102 receive audio transmissions 114, 116 of similar quality regardless of their location relative to the transmitters 108 and receivers 112 (e.g., regardless of the location of the computing devices 102 within a service area of the transmitters 108 and receivers 112).

The computing devices 102, 104 may generate audio transmissions 114, 116 to transmit data 122, 124 to one another. For example, the computing devices 102 may generate one or more audio transmissions 114 to transmit data 122 from the computing device 102 to the computing device 104. As another example, the computing device 104 may generate one or more audio transmissions 116 to transmit data 124 from the computing device 104 to the computing device 102. In particular, the computing devices 102, 104 may create one or more packets 118, 120 based on the data 122, 124 (e.g., including a portion of the data 122, 124) for transmission using the audio transmissions 114, 116. To generate the audio transmission 114, 116, the computing devices 102, 104 may modulate the packets 118, 120 onto an audio carrier signal. The computing devices 102, 104 may then transmit the audio transmission 114, 116 via the transmitter 106, 108, which may then be received by the receiver 110, 112 of the other computing devices 102, 104. In certain instances (e.g., where the data 122, 124 exceeds a predetermined threshold for the size of a packet 118, 120), the data 122, 124 may be divided into multiple packets 118, 120 for transmission using separate audio transmissions 114, 116.

Accordingly, by generating and transmitting audio transmissions 114, 116 in this way, the computing devices 102, 104 may be able to transmit data 122, 124 to one another without having to communicatively pair the computing devices 102, 104. Rather, a computing device 102, 104 can listen for audio transmissions 114, 116 received via the receivers 110, 112 from another computing device 102, 104 without having to communicatively pair with the other computing device 102, 104. Also, because these techniques can utilize conventional computer hardware like speakers and microphones, the computing devices 102, 104 do not require specialized hardware to transmit the data 122, 124.

However, transmitting data by audio transmissions includes other limitations. In particular, when multiple computing devices are attempting to transmit audio transmissions to the same computing device, the audio transmissions may conflict with one another. For example, audio transmissions sent using the same frequency (e.g., the same carrier frequency) may conflict with one another, which may leave the computing device that is supposed to receive the audio transmissions unable to parse or process the audio transmissions. Typically, communication system may utilize time-based controls for when computing devices can send audio transmissions to a receiving computing device. For example, certain communication systems may utilize a time-division multiple access (TDMA) protocol to assign time slots when each computing device is allowed to transmit. Communication systems may also utilize carrier-sense techniques in which a computing device determines whether another computing device is transmitting before beginning to transmit data. For example, certain communication systems may utilize a carrier-sense multiple access (CSMA) protocol to restrict computing devices to transmitting only when other computing devices are not.

However, such techniques for controlling audio transmission may not be suitable for use audio transmissions containing data. In particular, transmitting data using audio may have a lower bandwidth than transmitting data using electromagnetic signals, and processing audio signals may take more time as a result. Therefore, techniques such as CSMA that attempt to determine whether a carrier signal from another computing device are present may not be suitable, as processing received audio signals to detect carrier signals for an audio transmission may take too much time. Furthermore, as a result of hardware limitations in transmitters such as speakers, audio transmissions may require a large timing buffer (e.g., 0.2 seconds or more) by which the timing for a received audio transmission can deviate from an expected time of receipt. Therefore, timing-based control techniques may similarly take too much time because of the additional time added before and after each timing segment to account for the required buffer.

Therefore, there exists a need to transmit audio transmissions from multiple computing devices in a way that does not require timing-based control or prior detection of carrier audio signals from other computing devices. One solution to this problem is to transmit audio signals using multiple audio channels that each represent a portion of the audio spectrum in which audio transmissions can be transmitted and received. To transmit an audio transmission, a computing device may select (e.g., randomly select) one of the audio channels and may transmit the audio transmission using the selected audio channel. The computing device may then wait to receive an acknowledgment of the received audio transmission. If the computing device does receive the acknowledgment, the computing device may determine that the audio transmission was successfully transmitted using the selected channel. If the computing device does not receive the acknowledgment (e.g., within a predetermined period of time), the computing device may determine that the audio transmission was not successfully transmitted. In response, the computing device may select another audio channel and may transmit the audio transmission using the newly-selected audio channel.

Figure 2:
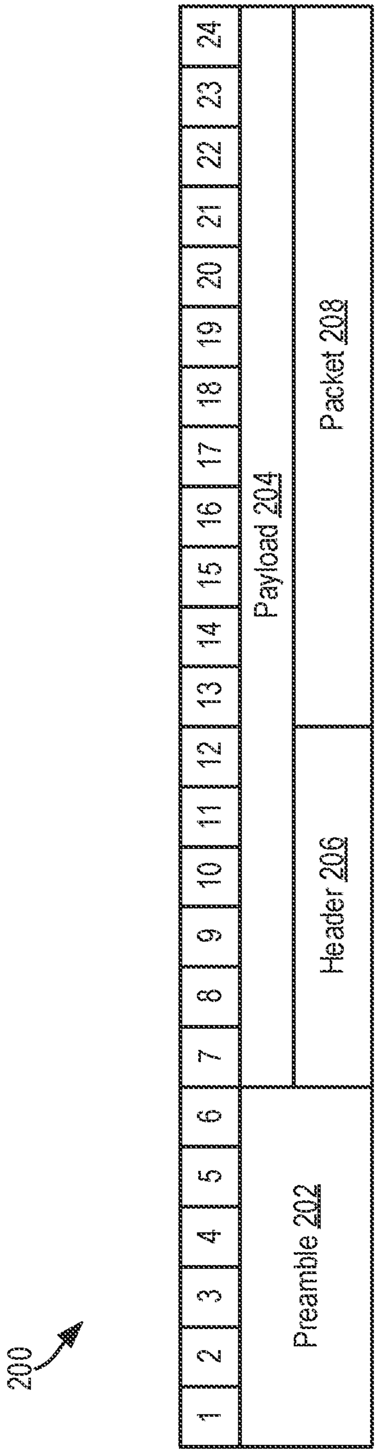
FIG. 2 illustrates an audio transmission according to an exemplary embodiment of the present disclosure.

FIG. 2 illustrates an audio transmission 200 according to an exemplary embodiment of the present disclosure. The audio transmission 200 may be used to transmit data from one computing device to another computing device. For example, referring to FIG. 1, the audio transmission 200 may be an example implementation of the audio transmissions 114, 116 generated by the computing devices 102, 104. The audio transmission 200 includes multiple symbols 1-24, which may correspond to discrete time periods within the audio transmission 200. For example, each symbol 1-24 may correspond to 2 ms of the audio transmission 200. In other examples, the symbols 1-24 may correspond to other time periods within the audio transmission 200 (e.g., 1 ms, 10 ms, 20 ms, 40 ms). Each symbol 1-24 may include one or more frequencies used to encode information within the audio transmission 200. For example, the one or more frequencies may be modulated in order to encode information in the audio transmission 200 (e.g., certain frequencies may correspond to certain pieces of information). In another example, the phases of the frequencies may be additionally or alternatively be modulated in order to encode information in the audio transmission 200 (e.g., certain phase differences from a reference signal may correspond to certain pieces of information).

In particular, certain symbols 1-24 may correspond to particular types of information within the audio transmission 200. For example, the symbols 1-6 may correspond to a preamble 202 and symbols 7-24 may correspond to a payload 204. The preamble 202 may contain predetermined symbols produced at predetermined points of time (e.g., by varying one or more of the frequency and the phase in a predetermined way for the frequencies 1-6). The preamble 202 may be used to identify the audio transmission 200 to a computing device receiving the audio transmission 200. For example, a receiver of the computing device receiving audio transmissions such as the audio transmission 200 may also receive other types of audio data (e.g., audio data from environmental noises and/or audio interference). The preamble 202 may therefore be configured to identify audio data corresponding to the audio transmission 200 when received by the receiver of the computing device. In particular, the computing device may be configured to analyze incoming audio data from the receiver and to disregard audio data that does not include the preamble 202. Upon detecting the preamble 202, the computing device may begin receiving and processing the audio transmission 200. The preamble may also be used to align processing of the audio transmission 200 with the symbols 1-24 of the audio transmission 200. In particular, by indicating the beginning of the audio transmission 200, the preamble 202 may enable the computing device receiving the audio transmission 200 to properly align its processing of the audio transmission with the symbols 1-24.

The payload 204 may include the data intended for transmission, along with other information enabling proper processing of the data intended for transmission. In particular, the packets 208 may contain data desired for transmission by the computing device generating the audio transmission 200. For example, and referring to FIG. 1, the packet 208 may correspond to the packets 118, 120 which may contain all or part of the data 122, 124. The header 206 may include additional information for relevant processing of data contained within the packet 208. For example, the header 206 may include routing information for a final destination of the data (e.g., a server external to the computing device receiving the audio transmission 200). The header 206 may also indicate an originating source of the data (e.g., an identifier of the computing device transmitting the audio transmission 200 and/or a user associated with the computing device transmitting the audio transmission 200).

Symbols 1-24 and their configuration depicted in FIG. 2 are merely exemplary. It should be understood that certain implementations of the audio transmission 200 may use more or fewer symbols, and that one or more of the preamble 202, the payload 204, the header 206, and/or the packet 208 may use more or fewer symbols than those depicted and may be arranged in a different order or configuration within the audio transmission 200.

Figure 3A:
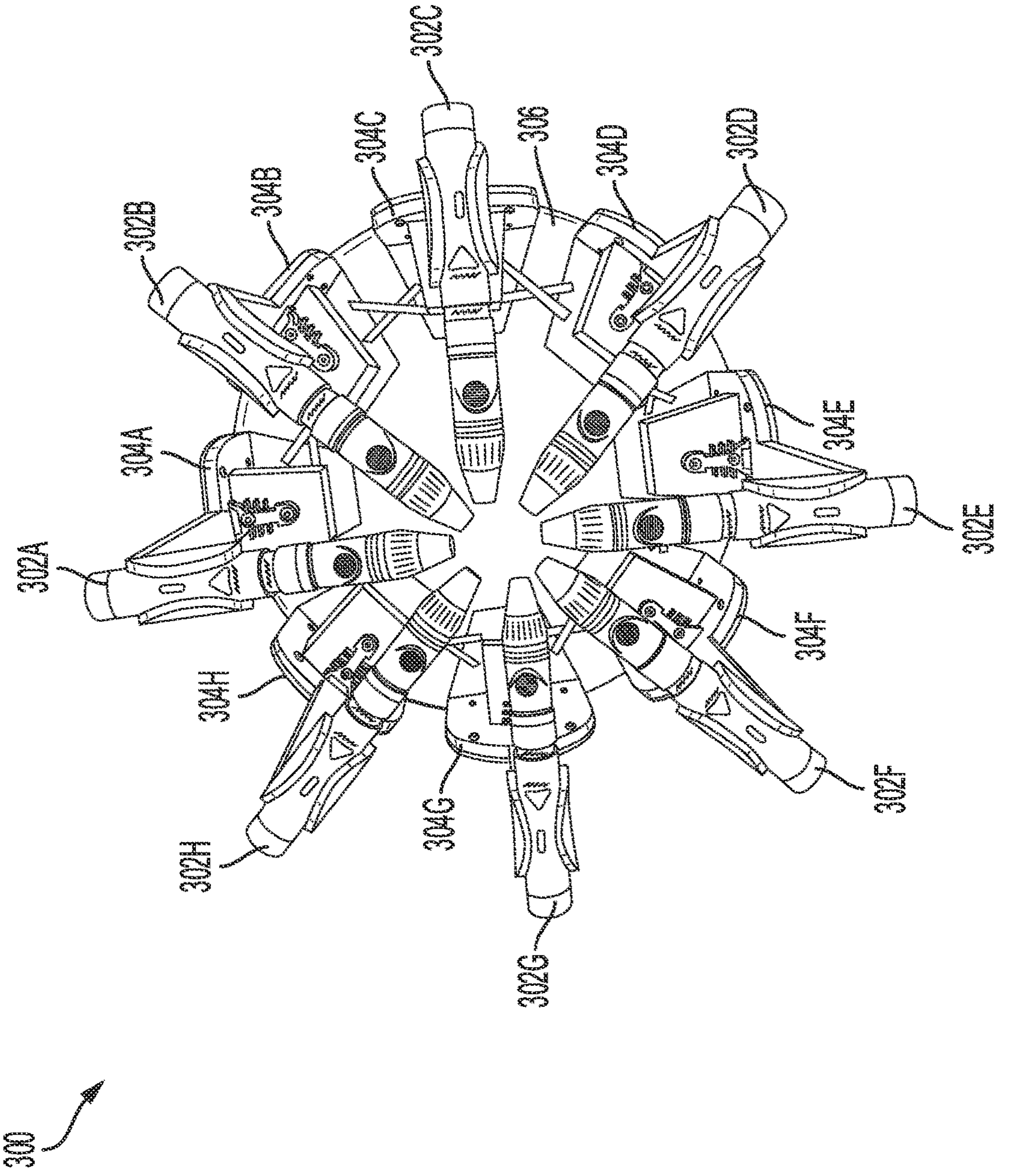
FIGS. 3A-3B illustrate transmitter/receiver array according to an exemplary embodiment of the present disclosure.
Figure 3B:
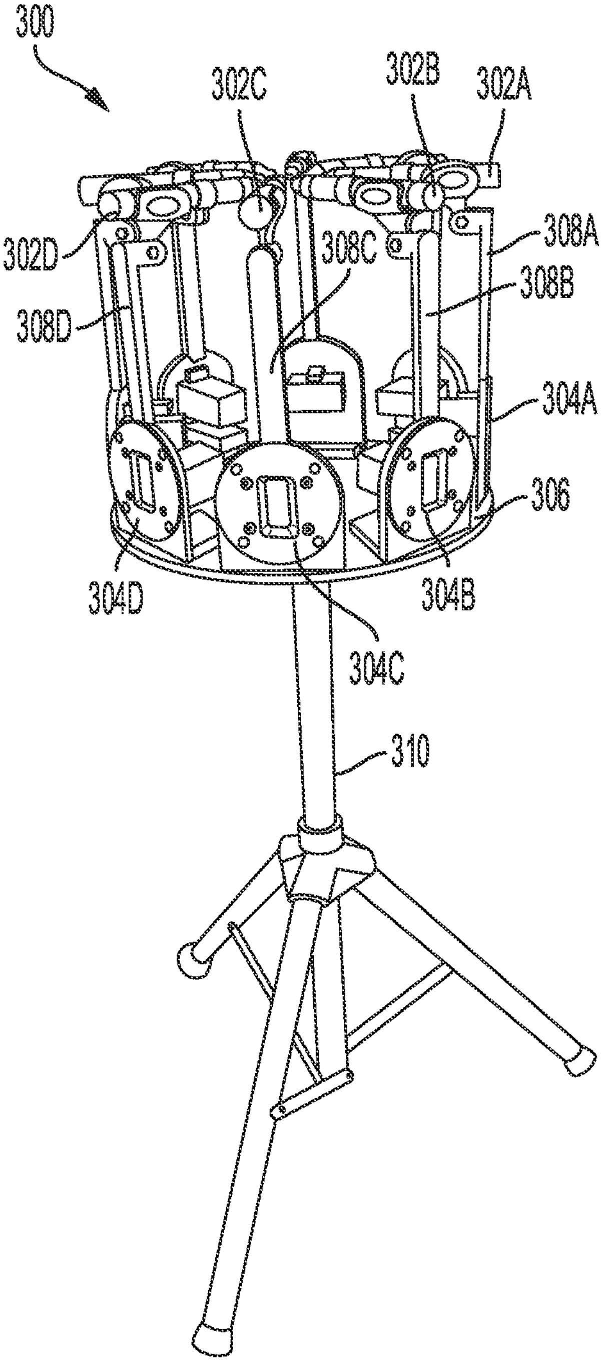

FIGS. 3A-3B illustrate a transmitter/receiver array 300 according to an exemplary embodiment of the present disclosure. The transmitter/receiver array 300 may be used to transmit and/or receive audio transmission 200. For example, the transmitter/receiver array 300 may be an exemplary implementation of at least one of the computing devices 102, 104. The transmitter/receiver array 300 includes eight receivers 302A-H and eight transmitters 304A-H. Each of the eight receivers 302A-H may be exemplary implementations of the receivers 110, 112. For example, the eight receivers 302A-H may be implemented as microphones. Each of the eight transmitters 304A-H may be exemplary implementations of the transmitters 106, 108. For example, the eight transmitters 304A-H may be implemented as speakers.

As depicted, the receivers 302A-H and the transmitters 304A-H are arranged to evenly cover a 360° area surrounding the transmitter/receiver array 300. For example, the receivers 302A-H and transmitters 304A-H are arranged so that there is approximately 45° between adjacent receivers 302A-H and adjacent transmitters 304A-H. Such a configuration may enable the transmitter/receiver array 300 receive audio transmissions 200 from and transmit audio transmissions 200 to multiple directions within a coverage area of the transmitter/receiver array 300. For example, the transmitter/receiver array 300 may be configured to receive audio transmissions from multiple computing devices in different portions of a service area.

The receivers 302A-H and the transmitters 304A-H may be mounted on a support body 306. The support body 306 may allow the transmitter/receiver array 300 to be positioned and configured without altering the relative orientation of the receivers 302A-H and the transmitters 304A-H. In certain implementations, the receivers 302A-H may be mounted such that the receivers 302A-H are separated from the transmitters 304A-H (e.g., so that the receivers 302A-H can avoid interference from the transmitters 304A-H). For example, the receivers 302A-H may be mounted on structural members 308A-D (only a subset of which are depicted in FIG. 3B) that separate the receivers 302A-H from the transmitters 304A-H. In certain implementations, the transmitter/receiver array 300 may be mounted on a support element, such as the support element 310. The support element 310 may raise the transmitter/receiver array 300 from the ground such that the transmitter/receiver array 300 is at a height better suited to receiving and transmitting audio transmission 200 (e.g., at or between chest and waist height for a typical individual).

It should be appreciated that additional or alternative implementations of the transmitter/receiver array 300 are possible. For example, alternative implementations may have more or fewer transmitters and/or receivers and/or may have larger or smaller transmitters and/or receivers. As another example, alternative implementations may omit one or more of the support body 306, the structural members 308A-D, and/or the support elements 310. As yet another example, alternative implementations may further include a housing surrounding the transmitters 304A-H and/or receivers 302A-H.

Figure 4:
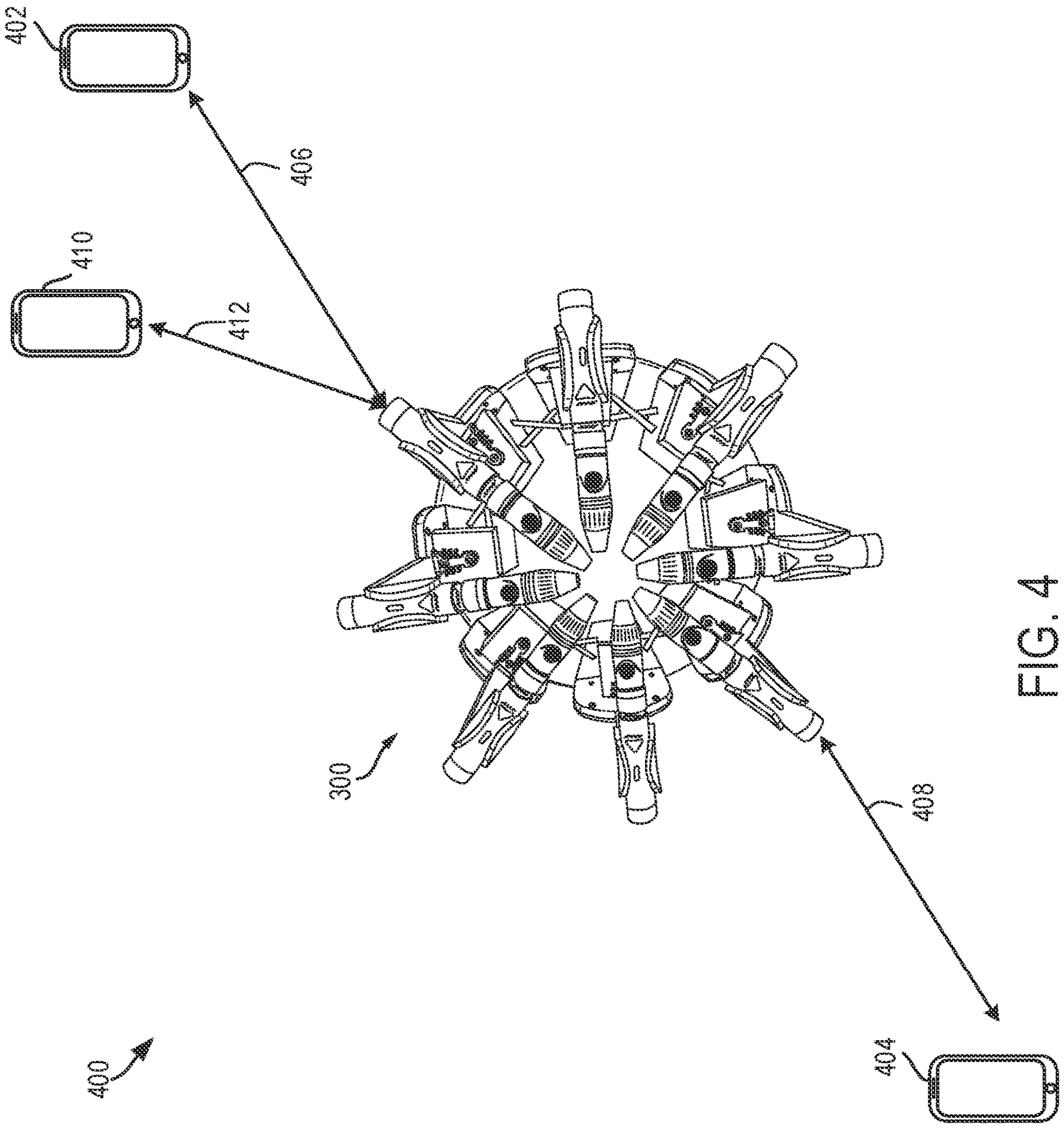
FIG. 4 illustrates a scenario according to an exemplary embodiment of the present disclosure.

FIG. 4 illustrates a scenario 400 according to an exemplary embodiment of the present disclosure. In the scenario 400, a computing device 402 is transmitting an audio transmission 406 to the transmitter/receiver array 300. Another computing device 404 is transmitting an audio transmission 408 to the transmitter/receiver array 300 from a different direction, so the audio transmission 408 may be received by different microphones than the audio transmission 406. The scenario 400 includes a third computing device 410 transmitting an audio transmission 412 from the same or similar direction as the computing device 402. In instances where the computing devices 402, 404 are transmitting using the same audio channel, the computing device receiving the audio transmissions 406, 408 may still be able to distinguish both audio transmission because the audio transmission 406, 408 were transmitted from different directions and received by different microphones. However, if the audio transmissions 406, 412 are transmitted using the same audio channel, the computing device receiving the audio transmission 406, 408 may be unable to distinguish the audio transmissions because the transmissions are transmitted from similar directions and are therefore received by the same or similar microphones and may interfere with one another. Further, if the audio transmissions 406, 408 are transmitted using different channels, the accuracy of the received audio signals may improve (e.g., because the audio signals 406, 408 are not interfering with one another).

Figure 5:
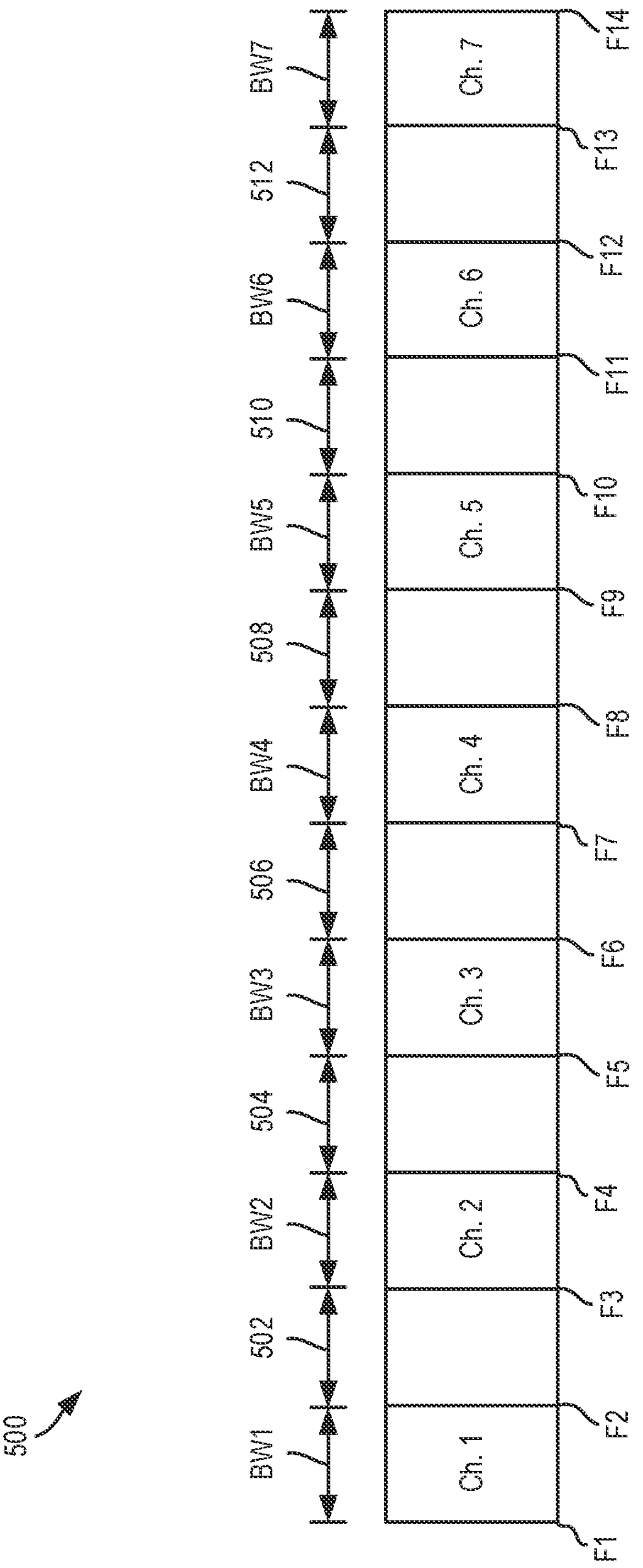
FIG. 5 illustrates an audio channel distribution according to an exemplary embodiment of the present disclosure.

FIG. 5 illustrates an audio channel distribution 500 according to an exemplary embodiment of the present disclosure. The audio channel distribution 500 includes audio channels 1-7 distributed along a frequency spectrum F1-F15. Each audio channel 1-7 has a corresponding bandwidth BW1-7. In particular, audio channel 1 has a bandwidth BW1 spanning from F1 to F2, audio channel 2 has a bandwidth BW2 spanning from F3 to F4, audio channel 3 has a bandwidth BW3 spanning from F5 to F6, audio channel 4 has a bandwidth BW4 spanning from F7 to F8, audio channel 5 has a bandwidth BW5 spanning from F9 to F10, audio channel 6 has a bandwidth BW6 spanning from F11 to F12, and audio channel 7 has a bandwidth BW7 spanning from F13 to F14. The audio channels 1-7 may represent a range of carrier frequencies that can be used to transmit audio transmissions. For example, to transmit an audio transmission according to an audio channel 1, a computing device may utilize a carrier frequency between F1 and F2. In certain implementations, the computing device may use a carrier frequency halfway between F1 and F2. As a specific example, where F1 is 9.5 kHz and F2 is 10.5 kHz, a computing device transmitting an audio transmission using audio channel 1 may utilize a carrier frequency between 9.8 and 10.2 kHz, such as 10 kHz.

The audio channels 1-7 are also separated by frequency bands 502, 504, 506, 508, 510, 512. In particular, frequency band 502 separates audio channels 1 and 2 and spans from frequency F2 to F3, frequency band 504 separates audio channels 2 and 3 and spans from frequency F4 to F5, frequency band 506 separates audio channels 3 and 4 and spans from frequency F6 to F7, frequency band 508 separates audio channels 4 and 5 and spans from frequency F8 to F9, frequency band 510 separates audio channels 5 and 6 and spans from frequency F10 to F11, and frequency band 512 separates audio channels 6 and 7 and spans from frequency F12 to F13. The frequency bands 502, 504, 506, 508, 510, 512 may separate the audio channels 1-7, which may help prevent audio transmissions from interfering with one another. For example, inaccuracies in the transmitters of computing devices (e.g., inaccuracies in the clock synchronization of the computing devices) may result in audio transmissions with inaccurate carrier frequencies (e.g., carrier frequencies that deviate from desired or preferred carrier frequencies within a given audio channel 1-7). As another example, interference with an audio transmission (e.g., movement of the computing device while transmitting the audio transmission) may shift or otherwise alter the carrier frequency of the audio transmission when it is received. In either of these instances, the changes to the carrier frequency may cause all or part of the audio transmission to occur outside of a desired audio channel. As a specific example, where a computing device is using audio channel 2, the audio transmission may include portions that have a higher frequency than F3 and/or a lower frequency than F2. In such instances, if the frequency bands 502, 504 were not separating the audio channel 2 from the audio channels 1, 3, the audio transmission may overlap with one of the audio channels 1, 3, interfering with audio transmissions in the audio channels 1, 3. Therefore, the frequency bands 502, 504, 506, 508, 510, 512 may help improve the accuracy of received transmissions by reducing and/or preventing audio transmission interference across channels.

In certain implementations, the audio channels 1-7 may have equal bandwidths BW1-7. For example, each of the bandwidths 1-7 may be 1 kHz wide, although other implementations may also be used (e.g., bandwidths of 500 Hz, 2 kHz, 5 kHz). In additional or alternative implementations, the audio channels 1-7 may have different bandwidths BW1-7. Additionally, in certain implementations, the frequency bands 502, 504, 506, 508, 510, 512 may be of equal width. For example, each of the frequency bands 502, 504, 506, 508, 510, 512 may be 1 kHz wide, although other implementations may also be used (e.g., frequency bands of 500 Hz, 2 kHz, 5 kHz). In further implementations, the frequency bands 502, 504, 506, 508, 510, 512 may have different widths.

In certain implementations, the bandwidths BW1-7 and frequency bands 502, 504, 506, 508, 510, 512 may have the same width. For example, the bandwidths BW1-7 and frequency bands 502, 504, 506, 508, 512 may all have a width of 1 kHz. In such instances, frequency F1 may be 9.5 kHz, frequency F2 may be 10.5 kHz, frequency F3 may be 11.5 kHz, frequency F4 may be 12.5 kHz, frequency F5 may be 13.5 kHz, frequency F6 may be 14.5 kHz, frequency F7 may be 15.5 kHz, frequency F8 may be 16.5 kHz, frequency F9 may be 17.5 kHz, frequency F10 may be 18.5 kHz, frequency F11 may be 19.5 kHz, frequency F12 may be 20.5 kHz, frequency F13 may be 21.5 kHz, and frequency F14 may be 22.5 kHz.

It should also be understood that alternative embodiments of the audio channel distribution 500 may use additional or fewer channels. For example, the alternative implementations may include 10 audio channels. As another example, alternative implementations may include five or six audio channels. In particular, instead of utilizing two audio channels 1-2 as control channels, only audio channel 1 may be used as a control channel, which may therefore result in six total audio channels (e.g., audio channel 7 may not be used). In still further implementations, no control channel may be used, resulting in five total audio channels (e.g., audio channels 6, 7 may not be used).

Figure 6:
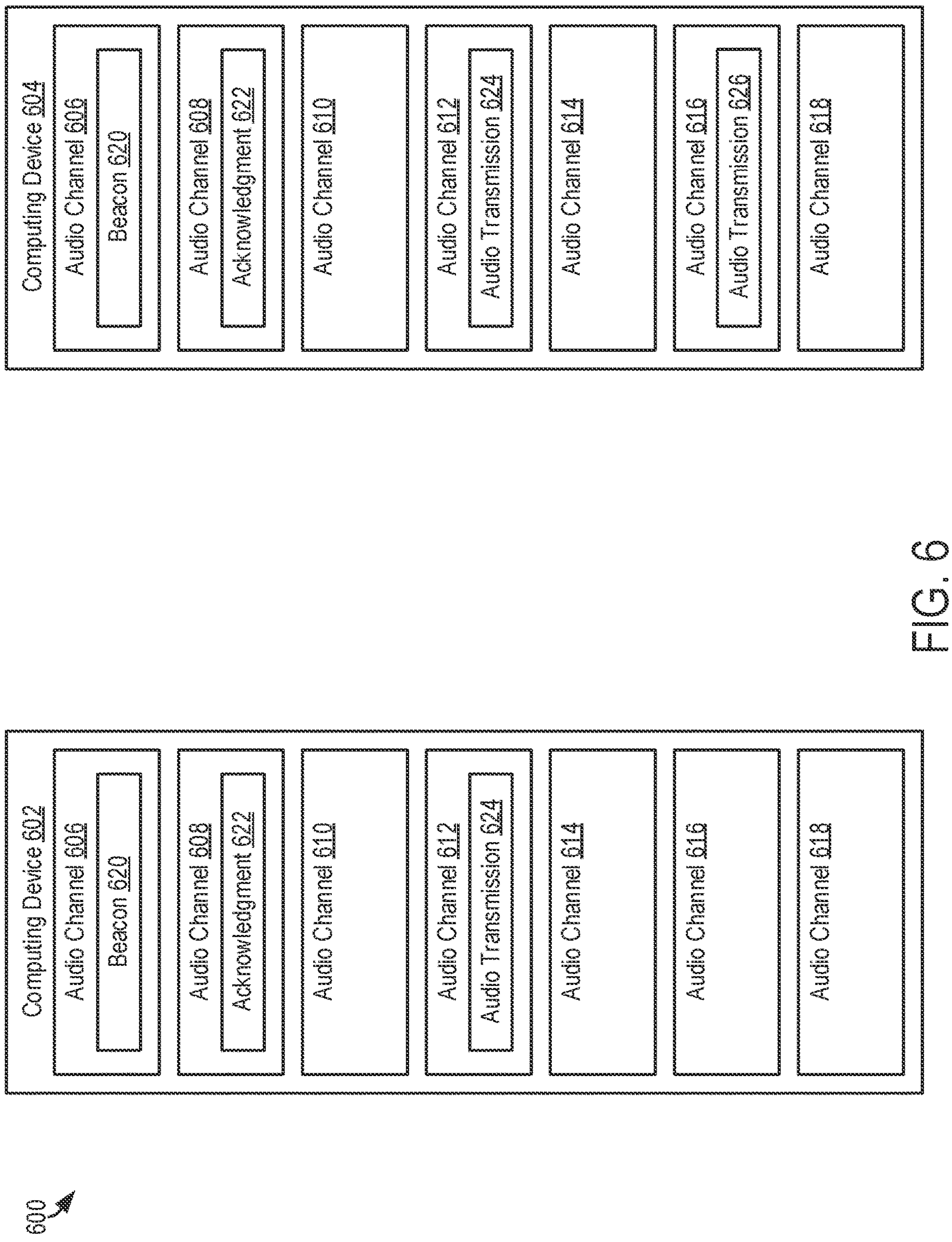
FIG. 6 illustrates a system according to an exemplary embodiment of the present disclosure.

FIG. 6 illustrates a system 600 according to an exemplary embodiment of the present disclosure. The system 600 may be configured to transmit and receive audio transmissions using multiple audio channels. In particular, the system 600 includes computing devices 602, 604, which may be configured to utilize multiple audio channels 606, 608, 610, 612, 614, 616, 618 to transmit audio transmissions. The computing device 604 may be an exemplary implementation of a primary computing device configured to receive audio transmissions from multiple other computing devices (e.g., secondary computing devices). For example, the computing device 604 may be a merchant device connected to a point-of-sale (POS) device and may receive multiple audio transmissions from multiple computing devices receive and process payments. In certain implementations, the computing device 604 may be connected to a transmitter/receiver array, such as the transmitter/receiver array 300, in order to receive and process audio transmissions from multiple computing devices.

The computing device 602 may be an exemplary implementation of a secondary computing device configured to transmit audio transmissions to the computing device 604 (e.g., to process payments). In certain implementations, the computing device 602 may be implemented by one or more of a smartphone, smartwatch, tablet computing device, laptop, or other personal computing device.

Both of the computing devices 602, 604 have audio channels 606, 608, 610, 612, 614, 616, 618, which may be utilized to transmit and receive audio transmissions. For example, the audio channels 606, 608, 610, 612, 614, 616, 618 may respectively be exemplary implementations of the audio channels 1-7 of the audio channel distribution 500. In certain implementations, the computing devices 602, 604 may be configured to transmit and receive audio transmissions using different subsets of the audio channels 606, 608, 610, 612, 614, 616, 618. For example, the computing device

602 may be configured to transmit audio transmissions using one or more of the audio channels 610, 612, 614, 616, 618 and to receive audio transmissions using the audio channels 606, 608. As another example, the computing device 604 may be configured to transmit audio transmissions using the audio channels 606, 608 and to receive audio transmissions using the audio channels 610, 612, 614, 616, 618. In still further implementations, the computing devices 602, 604 may both be configured to transmit and receive audio transmissions using the audio channels 608, 610, 612, 614, 616, 618.

In particular, the computing device 604 may be configured to transmit a beacon 620 using the audio channel 606. The beacon 620 may include an identifier (e.g., a unique identifier) of the computing device 604. For example, each primary computing device in a system (e.g., an audio transmission system) may be assigned a unique identifier and the computing device 604 may include its corresponding unique identifier in the beacon 620. In certain implementations, the beacon 620 may also include information regarding channels supported by the computing device 604. For example, the beacon may include numeric identifiers of channels (e.g., channels 1-7) and/or may include frequency ranges for supported channels. As another example (e.g., where the computing device 604 is configured to receive audio transmissions in connection with processing payments), the computing device 604 may communicate with a server (e.g., a payment processing server) before transmitting beacons 620 and may receive a unique identifier (e.g., a EuroPay®, Mastercard®, Visa® (EMV) value) for use in processing payments and may include the unique identifier in the beacon 620 for use in generating the audio transmission 624. In additional or alternative implementations, the beacon may include a public key (e.g., for use in secure encryption of audio transmission).

The beacon 620 may be used to indicate to other computing devices 602 that the computing device 604 is located nearby and is capable of receiving audio transmissions. In particular, the computing device 604 may transmit the beacon 620 at regular intervals (e.g., every 0.5 seconds, 1 second, 2 seconds, 5 seconds) using the audio channel 606. Other computing devices may selectively analyze audio signals received via the audio channel 606 (e.g., audio channels contained between frequencies corresponding to the audio channel 606) for the beacon to determine when audio transmissions can be transmitted. For example, the computing device 602 may need to transmit an audio transmission 624 and may therefore analyze signals received via the audio channel 606.

Upon detecting the beacon 620 in the audio channel 606, the computing device 602 may determine that the audio transmission 624 can be transmitted. In particular, because the computing device 602 received the beacon 620, the computing device 602 may determine that a computing device 604 capable of receiving audio transmissions 624 may be located nearby (e.g., within audio transmission range, such as within 10-200 feet). Therefore, the computing device 602 may select an audio channel 610, 612, 614, 616, 618 for use in transmitting the audio transmission 624. In certain implementations, the computing device 602 may randomly select from among the audio channels 610, 612, 614, 616, 618 that the computing device 602 is configured use for transmitting audio transmissions 624. For example, the computing device 602 may randomly select the audio channel 612 as depicted for use in transmitting the audio transmission 624. The computing device 602 may then transmit the audio transmission 624 using the audio channel 612 (e.g., by modulating the audio transmission 624 onto a carrier frequency of the audio channel 624) and transmitting the audio transmission using a transmitter of the computing device 602.

The computing device 604 may then receive the audio transmission 624 via the audio channel 612. For example, the computing device 604 may be configured to regularly analyze audio signals corresponding to each of the audio channels 610, 612, 614, 616, 618. Upon performing such an analysis, the computing device 604 may detect the audio transmission 624 in the audio channel 612 (e.g., by detecting a preamble 202 of the audio transmission 624). Upon detecting the audio transmission 624, the computing device 604 may perform subsequent processing of the audio transmission 624. For example, where the audio transmission 624 is transmitted to process a payment, the audio transmission 624 may include an indication of the payment to be processed and the computing device 604 may proceed with processing the payment (e.g., by interfacing with one or more payment systems and/or servers). Upon completing subsequent processing of the audio transmission 624 and/or upon receiving the audio transmission 624, the computing device 604 may generate an acknowledgment 622. In certain implementations, the acknowledgment 622 may include an identifier of the audio transmission 624, such as a unique identifier included within the audio transmission 624 (e.g., a unique identifier of the audio transmission 624 and/or a computing device 602 that is the source of the audio transmission 624). In further implementations, the acknowledgment 622 may include performance information for a received audio transmission 624 (e.g., a signal-to-noise ratio for the audio transmission 624, a total processing time for the audio transmission 624). As another example, the acknowledgment 622 may be generated in response to data included within the audio transmission 624 (e.g., based on subsequent processing of the data). For example, the data may include data for authentication of a user associated with the source of the audio transmission 624 and the acknowledgment may be transmitted to indicate that authentication using the data was successful. The computing device 604 may then transmit the acknowledgment 622 using the audio channel 608 (e.g., by modulating the acknowledgment 622 onto a carrier signal of the audio channel 608).

In certain instances, the computing device 604 may receive another audio transmission 626 from another computing device (e.g., from another secondary computing device similar to the computing device 602). As depicted, the audio transmission 626 may be received along an audio channel 616 different from the audio channel 612 along which the audio transmission 624 was received. In such instances, upon detecting the audio transmission 626, the computing device 604 may generate a second acknowledgment using techniques similar to those discussed above in connection with the acknowledgment 622. The second acknowledgment may similarly be transmitted using the audio channel 608. In certain instances, the acknowledgments may be transmitted in a sequence determined based on the order in which the audio transmissions 624, 626 are received. For example, if the audio transmission 624 is received before the audio transmission 626, the acknowledgment 622 may be transmitted using the audio channel 608 before the second acknowledgment corresponding to the audio transmission 626 is transmitted. In additional or alternative instances, the acknowledgments 622 may be transmitted in a sequence determined based on the order in which the audio transmissions 624, 626 are processed. For example, the audio transmission 624 may be received before the audio transmission 626, but processing of the audio transmission 626 may be completed before completing processing of the audio transmission 624. Accordingly, the second acknowledgment corresponding to the audio transmission 626 may be transmitted before the acknowledgment 622.

The computing device 602 may then receive the acknowledgment 622 via the audio channel 608 (e.g., by analyzing audio signals within the frequency range corresponding to the audio channel 608). For example, after transmitting the audio transmission 624, the computing device 602 may analyze audio signals corresponding to the audio channel 608 in order to detect the acknowledgment 622. Upon receiving and detecting acknowledgment 622, the computing device 602 may verify that the acknowledgment 622 is transmitted in response to the audio transmission 624. For example, as described above, the acknowledgment 622 may be generated to include a unique identifier of the audio transmission 624 and/or to include a unique identifier generated based on the audio transmission 624. The computing device 602 may therefore analyze the unique identifier included within the acknowledgment 622 in order to verify that the acknowledgment 622 is transmitted in response to the audio transmission 624. As described above, the computing device 604 may receive multiple audio transmissions 624, 626 and may transmit different acknowledgments based on each audio transmission 624, 626. In certain instances, acknowledgments for different audio transmission 626 may be transmitted using the same audio channel 608, therefore, the computing device 602 may, in certain instances, detect an acknowledgment transmitted in response to an audio transmission 626 other than the audio transmission 624 transmitted by the computing device 602. Therefore, it may be necessary to verify that received acknowledgments 622 were transmitted in response to the audio transmission 624 transmitted by the computing device 602.

If the computing device 602 successfully verifies that the acknowledgment 622, the computing device 602 may determine that the audio transmission 624 was successfully received by the computing device 604. If the computing device 602 does not successfully verify the acknowledgment 622, the computing device 602 may determine that the audio transmission 624 was not successfully received. For example, in certain implementations, the computing device 602 may be configured to wait for a predetermined period of time (e.g., one second, two seconds, five seconds, 10 seconds) for an acknowledgment 622 from the computing device 604. In certain implementations, the computing device 602 may be configured to wait for the duration of the audio transmission 624 plus an expected duration of the beacon 620 and/or the acknowledgment 622. While waiting for the predetermined period of time, the computing device 602 may analyze audio signals corresponding to the audio channel 608 for an acknowledgment 622 transmitted in response to the audio transmission 624. If no such acknowledgment 622 is received during the predetermined period of time, the computing device 602 may determine that the audio transmission 624 was not successfully received by the computing device 604. For example, if the audio transmission 626 is transmitted using the same audio channel 612 as the audio transmission 624 (e.g., because the second computing device randomly selected the same audio channel 612 as the computing device 602), the audio transmissions 624, 626 may interfere with one another as described above. Due to the interference, the computing device 604 may be unable to detect and/or successfully process the audio transmission 624, 626 and may therefore transmit no acknowledgment 622 via the audio channel 608. Accordingly, the computing device 602 may not receive an acknowledgment 622 and may accordingly determine that the audio transmission 624 was not successfully transmitted.

In response to determining that the audio transmission 624 was not successfully transmitted, the computing device 602 may transmit the audio transmission 624 again. In particular, the computing device 602 may select another audio channel 610, 612, 614, 616, 618 for transmission of the audio transmission 624 a second time. In certain instances, the computing device 602 may again randomly select the audio channel 610, 612, 614, 616, 618. In still further implementations, the computing device 602 may exclude the audio channel 612 that was unsuccessfully used to transmit the audio transmission 624 the first time from the random selection process. For example, while retransmitting the audio transmission 624, the computing device 602 may randomly select between the audio channels 610, 614, 616, 618. In particular, upon determining that the audio transmission 624 was not successfully transmitted using the audio channel 612, the computing device 602 may store an indication that the audio channel 612 should not be used to transmit audio transmissions for a predetermined period of time (e.g., five seconds, 10 seconds, 30 seconds, one minute).

The computing device 602 may repeat the above-described process a predetermined number of times. For example, the computing device 602 may be configured to transmit and/or re-transmit the audio transmission 624 for up to a predetermined number of attempts (e.g., three attempts, four attempts, five attempts). If the audio transmission 624 is not successfully transmitted in the predetermined number of attempts, the computing device 602 may determine that the audio transmission 624 cannot be transmitted under the current conditions (e.g., because too many other computing devices are transmitting audio transmissions to the computing device 604 and/or because the computing device 602 has moved too far away from the computing device 604). In such instances, the computing device 602 may generate and display an error message, e.g., to a user of the computing device 602. The error message may indicate that audio transmissions are not available under the current conditions and that, if possible, other techniques should be used to transmit the information required. For example, where user is transmitting the audio transmission 624 to process a payment, the error message may indicate that the user should use alternative payment systems (e.g., physical credit cards).

In the examples discussed above, the computing device 604 is configured to transmit using two audio channels 606, 608: one audio channel 606 for transmission of beacons 620 and another audio channel 608 for transmission of acknowledgments 622. In certain implementations, it should be understood that more or fewer audio channels may be used by the computing device 604 for transmission of audio transmissions (e.g., beacons and/or acknowledgments). For example, the computing device 604 may use a single audio channel 606 for transmission of both beacons 620 and acknowledgments 622. As a specific example, the computing device 604 may typically transmit beacons at regular intervals using the audio channel 606, but may refrain from transmitting a beacon 620 when an acknowledgment 622 needs to be transmitted and may transmit the acknowledgment 622 using the audio channel 606.

As a further example, the computing device 604 may use the audio channels 610, 612, 614, 616, 618 for transmission of beacons 620 and/or acknowledgments 622 (e.g., by randomly selecting an audio channel 610, 612, 614, 616, 618 using techniques similar to those discussed above). In additional or alternative implementations, the computing device 604 may transmit the acknowledgment 622 using the same audio channel 612 on which the audio transmission 624 was received from another device 602. For example, in response to receiving the audio transmission 624, the computing device 604 may generate and transmit the acknowledgment 622 on the audio channel 612, instead of the audio channel 608. In such implementations, the audio channel 608 may instead be used for communication with other computing devices, increasing the overall audio communication bandwidth for the computing device 604.

Furthermore, responding on the same audio channel 612 may reduce the overall time that the computing device 602 needs to wait in order to receive the acknowledgment 622. In particular, when a single audio channel 608 is used to transmit acknowledgments 622, a computing device 602 may be required to wait for a duration of the audio transmission 624 that was transmitted plus an additional duration for the beginning 620 and/or acknowledgment 622 audio transmissions. In practice, audio transmissions 624 may contain more data, and therefore be longer in duration, and the audio transmissions used to transmit the beginning 620 and/or acknowledgments 622. Accordingly, having to wait for this additional time may substantially increase the overall idle time of the computing device 602 while the computing device 602 waits for an acknowledgment 622 from the computing device 604, reducing overall audio communication bandwidth between the computing devices 602, 604.

By contrast, by transmitting acknowledgments 622 within the same audio channel 612 in which audio transmission 624 were received, the computing device 604 may be able to communicate with (e.g., transmit acknowledgments 622 to) multiple computing devices. In particular, the computing device 604 may be able to transmit multiple acknowledgments 622 at least partially at the same time on different audio channels 608, 610, 612, 614, 616, 618. Accordingly, computing devices 602 may be configured to wait for shorter predetermined periods of time. For example, computing device 602 may be configured to wait for a predetermined period of time that is a multiple of an expected duration of the acknowledgment 622. In particular, the acknowledgment 622 may have expected data contents with a predefined expected duration and/or or expected maximum duration based on maximum data contents that can be included within the acknowledgment 622. The computing device 602 may accordingly wait for a multiple of the expected duration (e.g., 2× the expected duration, 4× the expected duration, 5× the expected duration, 8× the expected duration, 10× the expected duration) to receive the acknowledgment 622 and determine whether the audio transmission 624 is received.

In practice, this waiting period may be substantially shorter (e.g., 100 ms or less) than a typical waiting period for receiving and acknowledgment 622 from a common audio channel 608 (e.g., approximately one second). This waiting period may be even further reduced by omitting data payloads from the acknowledgment 622, further shortening the expected duration for the acknowledgment 622. In particular, because the acknowledgment 622 is transmitted on the same audio channel 612 is the audio transmission 624, it may not be necessary to indicate or specifically identify the particular audio transmission 624 that was received by the computing device 604. Accordingly, by virtue of receiving the acknowledgment 622 and the same audio channel 612, the computing device 602 may determine that the audio transmission 624 was successfully received by the computing device 604 without needing further information.

In still further implementations, the computing device 604 may use more than one audio channel 608 to transmit acknowledgments 622. For example, the computing device 604 may include two or more audio channels for transmitting acknowledgments 622. As a specific example, the computing device 604 may use one audio channel to transmit the acknowledgment 622 in response to the audio transmission 624 and may use another channel to transmit the second acknowledgment in response to the audio transmission 626. In such implementations, the computing device 602 may be configured to analyze both audio channels for the acknowledgment 622. In certain implementations, the audio channels 606, 608 used by the computing device 604 may additionally or alternatively be used for other purposes beyond transmitting beacons and receiving acknowledgments. For example, the audio channels 606, 608 may be used to transmit and/or receive information regarding one or more of services available from the computing device 604, audio channels supported by the computing device 604, data rates supported by the computing device 604, encryption techniques supported by the computing device 604, information regarding current communication performance between the computing devices 602, 604, and rate negotiations (e.g., negotiation of communication speeds required) for communication between the computing devices 602, 604.

Figure 7:
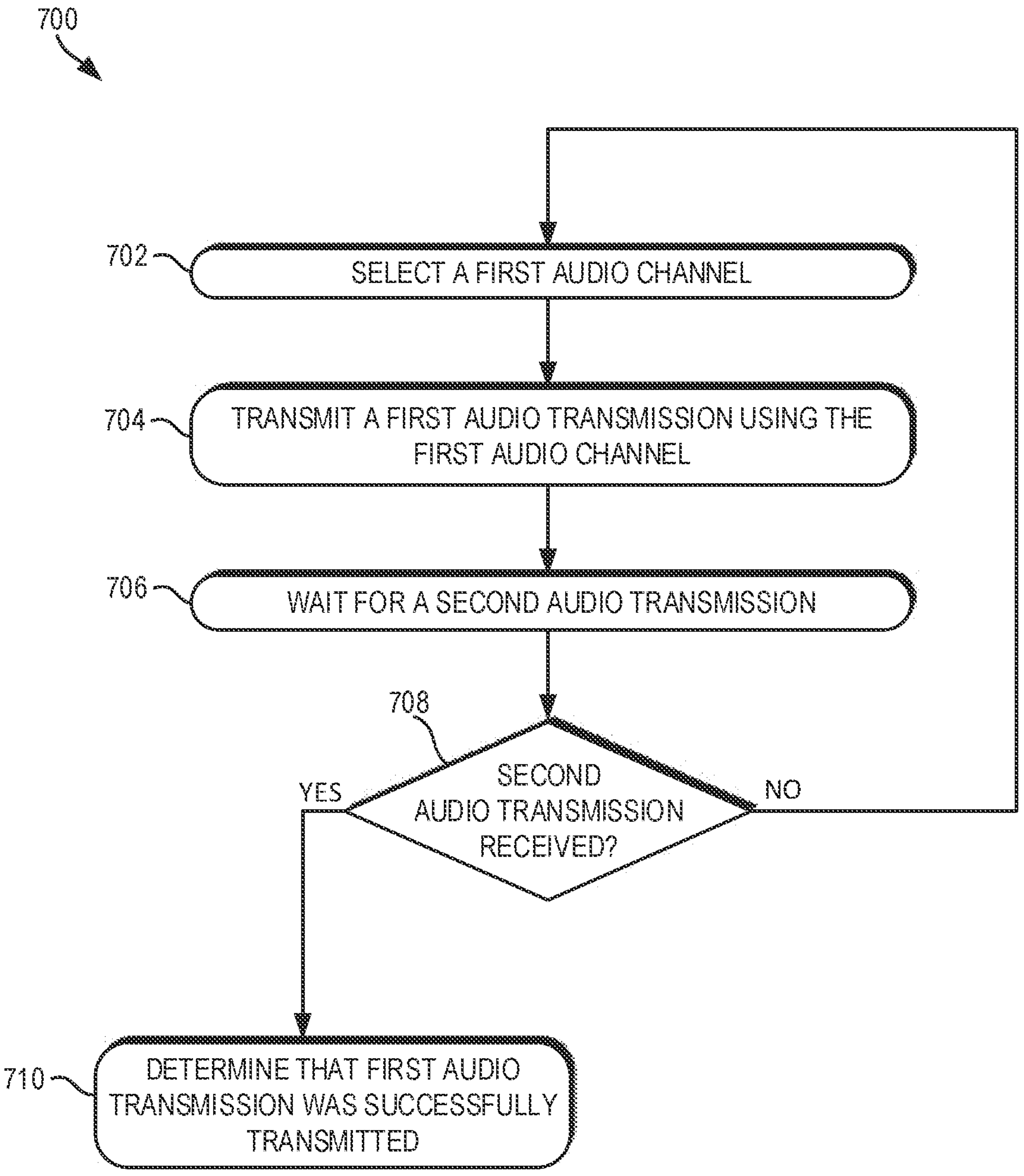
FIG. 7 illustrates a method according to an exemplary embodiment of the present disclosure.

FIG. 7 illustrates a method 700 according to an exemplary embodiment of the present disclosure. The method 700 may be performed to select between multiple audio channels for transmission of an audio transmission. For example, the method 700 may be performed by the computing device 602 to select an audio channel 610, 612, 614, 616, 618 for transmission of the audio transmission 624. The method 700 may be implemented on a computer system, such as the system 600. The method 700 may also be implemented by a set of instructions stored on a computer readable medium that, when executed by a processor, cause the computer system to perform the method 700. For example, all or part of the method 700 may be implemented by a processor and/or memory of the computing device 602. Although the examples below are described with reference to the flowchart illustrated in FIG. 7, many other methods of performing the acts associated with FIG. 7 may be used. For example, the order of some of the blocks may be changed, certain blocks may be combined with other blocks, one or more of the blocks may be repeated, and some of the blocks described may be optional.

The method 700 may begin with selecting a first audio channel (block 702). For example, the computing device 602 may select a first audio channel 612. In particular, the computing device 602 may be configured to transmit using one or more audio channels 610, 612, 614, 616, 618, which may each correspond to a particular frequency range. The computing device 602 may be configured to randomly select between the audio channels 610, 612, 614, 616, 618. For example, the computing device 602 may randomly select the audio channel 612, which may correspond to a frequency range of 15.5 kHz-16.5 kHz.

A first audio transmission may be transmitted using the first audio channel (block 704). For example, the computing device 602 may transmit the first audio transmission 624 using the first audio channel 612. To transmit the first audio transmission, the computing device 602 may modulate the audio transmission 624 onto a carrier frequency associated with the audio channel 612. As described above, the carrier frequency corresponding to an audio channel may include a middle frequency and/or middle range of frequencies within the frequency range of the audio channel. As a specific example, the carrier frequency for the audio channel 612 may be 16 kHz and/or may be 15.9-16.1 kHz. The computing device 602 may transmit the audio transmission 624 modulated onto the carrier frequency of the audio channel 612 using a transmitter of the computing device 602. For example, where the computing device 602 is a smartphone, the computing device 602 may transmit the audio transmission 624 modulated onto the carrier frequency using a speaker included within the smartphone.

The computing device may wait for a second audio transmission (block 706). The second audio transmission may be transmitted by a primary computing device 604 configured to receive the first audio transmission. The primary computing device 604 may be configured to generate and transmit a second type of audio transmission (e.g., an acknowledgment 622) in response to receiving audio transmissions 624 from computing devices such as the computing device 602. Accordingly, the computing device 602 may wait for the second audio transmission from the computing device 604 to indicate that the audio transmission 624 was successfully received by the computing device 604. In particular, the computing device 602 may wait to receive the second audio transmission along one or more separate, predetermined audio channels used by the computing device 604 to transmit audio transmissions, such as the audio channel 608. In further implementations, the computing device 602 may wait to receive the second audio transmission on the same audio channel 612 that was used to transmit the first audio transmission 624. In certain implementations, the computing device 602 may be configured to wait for the second audio transmission for a predetermined period of time (e.g., a multiple of an expected duration of the acknowledgment 622, one second, two seconds, five seconds, 10 seconds).

The computing device 602 may then determine whether the second audio transmission is received (block 708). For example, the computing device 602 may receive a second audio transmission (e.g., an acknowledgment 622) from the computing device 604 (e.g., via the audio channel 608). Upon receiving such an audio transmission, the computing device 602 may verify that the second audio transmission was transmitted in response to receiving the audio transmission 624, as discussed above. If the computing device 602 successfully verifies the second audio transmission, the computing device 602 may determine that the second audio transmission is received. In implementations where the second audio transmission is transmitted on the same audio channel as the first audio channel, the computing device 602 may determine that the second audio transmission was received based on receiving an audio transmission on the same audio channel without having to analyze the contents of the second audio transmission.

In response, the computing device 602 may determine that the first audio transmission was successfully transmitted (block 710). For example, the computing device 602 may determine that the audio transmission 624 was successfully transmitted to the computing device 604 using the first audio channel 612. In certain implementations, when the computing device 602 needs to subsequently transmit a new audio transmission (e.g., at a later time), the computing device 602 may repeat the method 700 to select an audio channel for use in transmitting the new audio transmission.

If the computing device 602 does not successfully verify the second audio transmission, the computing device 602 may continue waiting for a second audio transmission as discussed above in connection with the block 706. For example, the computing device 602 may continue waiting for up to the predetermined period of time to receive a second audio transmission that is successfully verified. If, after the predetermined period of time, the computing device 602 has not received a second audio transmission and/or has not successfully verified a received audio transmission, the computing device 602 may determine that the second audio transmission was not received. Therefore, as discussed above, the computing device 602 may determine that the audio transmission 624 was not successfully transmitted to the computing device 604 using the first audio channel 612. Accordingly, the computing device 602 may return to block 702 to select and transmit the audio transmission 624 using a second audio channel (e.g., a randomly-selected second audio channel).

By performing the method 700, the computing device 602 may be able to transmit audio transmissions using multiple audio channels while also responsively switching audio channels when other channels are in use by other computing devices. Furthermore, by randomly selecting audio channels to transmit the audio transmissions, the method 700 reduces the risk of multiple computing devices selecting the same audio channel. Accordingly, the method 700 may enable multiple computing devices 602 to communicate with the same computing device 604 using audio transmissions at the same time while also reducing the number of audio transmissions that need to be rebroadcast using alternative audio channels. Such techniques accordingly increase the overall system bandwidth and audio transmission throughput for the computing device 604, reducing the number of primary computing devices 604 required to receive and process audio transmissions 624, 626 from computing devices 602. Additionally, the method 700 enables the computing devices 602, 604 to communicate using multiple channels in a manner that is compatible with audio transmissions containing data, unlike previous channel selection protocols, such as TDMA.

Figure 8:
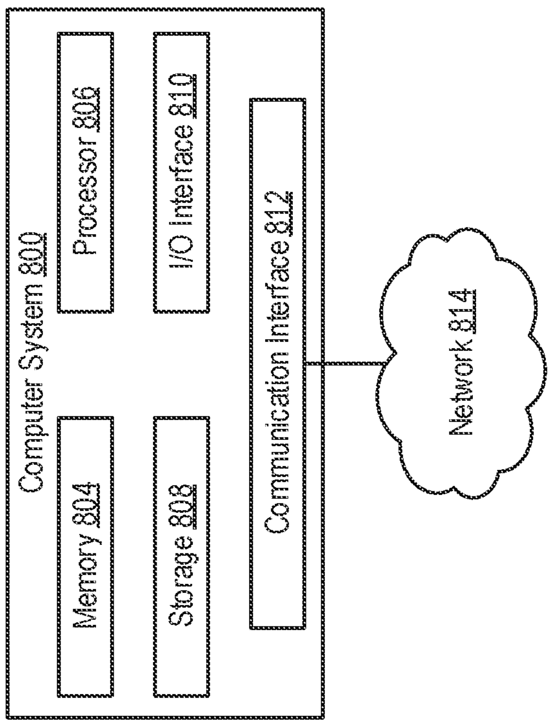
FIG. 8 illustrates a computing system according to an exemplary embodiment of the present disclosure.

FIG. 8 illustrates an example computer system 800 that may be utilized to implement one or more of the devices and/or components of FIG. 1, such as the computing devices 102, 104, 602, 604. In particular embodiments, one or more computer systems 800 perform one or more steps of one or more methods described or illustrated herein. In particular embodiments, one or more computer systems 800 provide the functionalities described or illustrated herein. In particular embodiments, software running on one or more computer systems 800 performs one or more steps of one or more methods described or illustrated herein or provides the functionalities described or illustrated herein. Particular embodiments include one or more portions of one or more computer systems 800. Herein, a reference to a computer system may encompass a computing device, and vice versa, where appropriate. Moreover, a reference to a computer system may encompass one or more computer systems, where appropriate.

This disclosure contemplates any suitable number of computer systems 800. This disclosure contemplates the computer system 800 taking any suitable physical form. As example and not by way of limitation, the computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, the computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 806, memory 804, storage 808, an input/output (I/O) interface 810, and a communication interface 812. Although this disclosure describes and illustrates a particular computer system having a particular number of particular components in a particular arrangement, this disclosure contemplates any suitable computer system having any suitable number of any suitable components in any suitable arrangement.

In particular embodiments, the processor 806 includes hardware for executing instructions, such as those making up a computer program. As an example and not by way of limitation, to execute instructions, the processor 806 may retrieve (or fetch) the instructions from an internal register, an internal cache, memory 804, or storage 808; decode and execute the instructions; and then write one or more results to an internal register, internal cache, memory 804, or storage 808. In particular embodiments, the processor 806 may include one or more internal caches for data, instructions, or addresses. This disclosure contemplates the processor 806 including any suitable number of any suitable internal caches, where appropriate. As an example and not by way of limitation, the processor 806 may include one or more instruction caches, one or more data caches, and one or more translation lookaside buffers (TLBs). Instructions in the instruction caches may be copies of instructions in memory 804 or storage 808, and the instruction caches may speed up retrieval of those instructions by the processor 806. Data in the data caches may be copies of data in memory 804 or storage 808 that are to be operated on by computer instructions; the results of previous instructions executed by the processor 806 that are accessible to subsequent instructions or for writing to memory 804 or storage 808; or any other suitable data. The data caches may speed up read or write operations by the processor 806. The TLBs may speed up virtual-address translation for the processor 806. In particular embodiments, processor 806 may include one or more internal registers for data, instructions, or addresses. This disclosure contemplates the processor 806 including any suitable number of any suitable internal registers, where appropriate. Where appropriate, the processor 806 may include one or more arithmetic logic units (ALUs), be a multi-core processor, or include one or more processors 806. Although this disclosure describes and illustrates a particular processor, this disclosure contemplates any suitable processor.

In particular embodiments, the memory 804 includes main memory for storing instructions for the processor 806 to execute or data for processor 806 to operate on. As an example, and not by way of limitation, computer system 800 may load instructions from storage 808 or another source (such as another computer system 800) to the memory 804. The processor 806 may then load the instructions from the memory 804 to an internal register or internal cache. To execute the instructions, the processor 806 may retrieve the instructions from the internal register or internal cache and decode them. During or after execution of the instructions, the processor 806 may write one or more results (which may be intermediate or final results) to the internal register or internal cache. The processor 806 may then write one or more of those results to the memory 804. In particular embodiments, the processor 806 executes only instructions in one or more internal registers or internal caches or in memory 804 (as opposed to storage 808 or elsewhere) and operates only on data in one or more internal registers or internal caches or in memory 804 (as opposed to storage 808 or elsewhere). One or more memory buses (which may each include an address bus and a data bus) may couple the processor 806 to the memory 804. The bus may include one or more memory buses, as described in further detail below. In particular embodiments, one or more memory management units (MMUs) reside between the processor 806 and memory 804 and facilitate accesses to the memory 804 requested by the processor 806. In particular embodiments, the memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory implementations, this disclosure contemplates any suitable memory implementation.

In particular embodiments, the storage 808 includes mass storage for data or instructions. As an example and not by way of limitation, the storage 808 may include a hard disk drive (HDD), a floppy disk drive, flash memory, an optical disc, a magneto-optical disc, magnetic tape, or a Universal Serial Bus (USB) drive or a combination of two or more of these. The storage 808 may include removable or non-removable (or fixed) media, where appropriate. The storage 808 may be internal or external to computer system 800, where appropriate. In particular embodiments, the storage 808 is non-volatile, solid-state memory. In particular embodiments, the storage 808 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 808 taking any suitable physical form. The storage 808 may include one or more storage control units facilitating communication between processor 806 and storage 808, where appropriate. Where appropriate, the storage 808 may include one or more storages 808. Although this disclosure describes and illustrates particular storage, this disclosure contemplates any suitable storage.

In particular embodiments, the I/O Interface 810 includes hardware, software, or both, providing one or more interfaces for communication between computer system 800 and one or more I/O devices. The computer system 800 may include one or more of these I/O devices, where appropriate. One or more of these I/O devices may enable communication between a person (i.e., a user) and computer system 800. As an example and not by way of limitation, an I/O device may include a keyboard, keypad, microphone, monitor, screen, display panel, mouse, printer, scanner, speaker, still camera, stylus, tablet, touch screen, trackball, video camera, another suitable I/O device or a combination of two or more of these. An I/O device may include one or more sensors. Where appropriate, the I/O Interface 810 may include one or more device or software drivers enabling processor 806 to drive one or more of these I/O devices. The I/O interface 810 may include one or more I/O interfaces 810, where appropriate. Although this disclosure describes and illustrates a particular I/O interface, this disclosure contemplates any suitable I/O interface or combination of I/O interfaces.

In particular embodiments, communication interface 812 includes hardware, software, or both providing one or more interfaces for communication (such as, for example, packet-based communication) between computer system 800 and one or more other computer systems 800 or one or more networks 814. As an example and not by way of limitation, communication interface 812 may include a network interface controller (NIC) or network adapter for communicating with an Ethernet or any other wire-based network or a wireless NIC (WNIC) or wireless adapter for communicating with a wireless network, such as a Wi-Fi network. This disclosure contemplates any suitable network 814 and any suitable communication interface 812 for the network 814. As an example and not by way of limitation, the network 814 may include one or more of an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a Bluetooth® WPAN), a WI-FI network, a WI-MAX network, a cellular telephone network (such as, for example, a Global System for Mobile Communications (GSM) network), or any other suitable wireless network or a combination of two or more of these. Computer system 800 may include any suitable communication interface 812 for any of these networks, where appropriate. Communication interface 812 may include one or more communication interfaces 812, where appropriate. Although this disclosure describes and illustrates a particular communication interface implementations, this disclosure contemplates any suitable communication interface implementation.

The computer system 802 may also include a bus. The bus may include hardware, software, or both and may communicatively couple the components of the computer system 800 to each other. As an example and not by way of limitation, the bus may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local bus (VLB), or another suitable bus or a combination of two or more of these buses. The bus may include one or more buses, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (e.g., field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method comprising:

selecting a first audio channel, wherein the first audio channel is randomly selected from among a plurality of audio channels;

transmitting a first audio transmission using the first audio channel;

receiving, within a predetermined period of time, a second audio transmission via the first audio channel; and determining, based on receiving the second audio transmission within the predetermined period of time, that the first audio transmission was successfully received.

2. The method of claim 1, wherein an expected duration of the second audio transmission is shorter than a duration of the first audio transmission, and wherein the predetermined period of time is a multiple of the expected duration of the second audio transmission.

3. The method of claim 2, wherein the multiple is greater than or equal to 2 and less than or equal to 4.

4. The method of claim 1, wherein the second audio transmission contains an acknowledgment of the first audio transmission.

5. The method of claim 1, further comprising, prior to selecting the first audio channel, detecting, on a second audio channel separate from the plurality of audio channels, a third audio transmission identifying a computing device.

6. The method of claim 5, wherein the second audio transmission is received from the computing device.

7. The method of claim 1, wherein the plurality of audio channels includes at least 5 audio channels.

8. The method of claim 1, wherein the plurality of audio channels each comprise a range of frequencies with a predetermined bandwidth.

9. The method of claim 8, wherein the plurality of audio channels are separated by a predetermined frequency band.

10. The method of claim 8, wherein the plurality of audio channels are contained within a range of 9.5-18.5 kHz.

11. A system comprising:

a processor; and a memory storing instructions which, when executed by the processor, cause the processor to:

select a first audio channel, wherein the first audio channel is randomly selected from among a plurality of audio channels;

transmit a first audio transmission using the first audio channel;

receive, within a predetermined period of time, a second audio transmission via the first audio channel; and determine, based on receiving the second audio transmission within the predetermined period of time, that the first audio transmission was successfully received.

12. The system of claim 11, wherein an expected duration of the second audio transmission is shorter than a duration of the first audio transmission, and wherein the predetermined period of time is a multiple of the expected duration of the second audio transmission.

13. The system of claim 12, wherein the multiple is greater than or equal to 2 and less than or equal to 4.

14. The system of claim 11, wherein the second audio transmission contains an acknowledgment of the first audio transmission.

15. The system of claim 11, wherein the instructions further cause the processor, prior to selecting the first audio channel, to: detect, on a second audio channel separate from the plurality of audio channels, a third audio transmission identifying a computing device.

16. The system of claim 15, wherein the second audio transmission is received from the computing device.

17. The system of claim 11, wherein the plurality of audio channels includes at least 5 audio channels.

18. The system of claim 11, wherein the plurality of audio channels each comprise a range of frequencies with a predetermined bandwidth.

19. The system of claim 18, wherein the plurality of audio channels are separated by a predetermined frequency band.

20. The system of claim 18, wherein the plurality of audio channels are contained within a range of 9.5-18.5 kHz.

* * * * *